United States Patent

Lanning

[15] 3,652,840

[45] Mar. 28, 1972

[54] APPARATUS FOR CONVERTING NUMBERS BETWEEN POSITIVE AND NEGATIVE RADICES

[72] Inventor: Walter C. Lanning, Plainview, N.Y.

[73] Assignee: Sperry Rand Corporation

[22] Filed: June 23, 1970

[21] Appl. No.: 49,440

[52] U.S. Cl. ............................................235/155, 235/175

[51] Int. Cl. ...........................................................G06f 5/02

[58] Field of Search ............235/155, 173, 175; 340/347 DD

[56] References Cited

UNITED STATES PATENTS 3,521,040 7/1970 Fentress................................235/155

3,389,245 6/1968 Deregt...................................235/175

OTHER PUBLICATIONS

G. Songster, " Negative–Base Number–Representation Systems," IEEE Trans. on Elec. Comp., June, 1963, pp. 274–277.

L. Wadel, " Conversion from Conventional to Negative–Base Number Representation," IRE Trans. on Elec. Comp., December, 1961; p. 779.

D. Dietmeyer, " Conversion from Positive to Negative and Imaginary Radix," IEEE Trans. on Elec. Comp., February, 1963; pp. 20–22.

*Primary Examiner*—Thomas A. Robinson
*Attorney*—S. C. Yeaton

[57] ABSTRACT

Apparatus for converting numbers between positive and negative radices comprising a first bistable element for providing signals representative of the odd and even orders of the number to be converted. Gating means responsive to the signals from the first bistable element and the digits of the number to be converted provides signals to the inputs of a second bistable element. An EXCLUSIVE OR logic circuit coupled to the output of the second bistable element and responsive to the digits of the number to be converted provides the converted digits of the number. Means are included to preset the first and second bistable elements to predetermined states, respectively, independently of the signs of the numbers to be converted.

8 Claims, 4 Drawing Figures

STATE DIAGRAMS

15

| PREVIOUS STATE | NEXT STATE | | OUTPUT | |
|---|---|---|---|---|
| | 0 | 1 | 0 | 1 |
| a | b | b | 0 | 1 |
| b | a | c | 0 | 1 |
| c | d | b | 1 | 0 |
| d | c | c | 1 | 0 |

INPUT (b)

12 (a)

| PREVIOUS STATE | NEXT STATE | | OUTPUT | |
|---|---|---|---|---|
| | 0 | 1 | 0 | 1 |
| a | b | b | 0 | 1 |
| b | a | c | 0 | 1 |
| c | b | d | 1 | 0 |
| d | c | c | 1 | 0 |

INPUT

13

(c) 17

| PREVIOUS STATE | NEXT STATE | | | | OUTPUT | | | |
|---|---|---|---|---|---|---|---|---|
| | $\overline{C0}$ | $\overline{C1}$ | C0 | C1 | $\overline{C0}$ | $\overline{C1}$ | C0 | C1 |
| a | b | b | b | b | 0 | 1 | 0 | 1 |
| b | a | c | a | c | 0 | 1 | 0 | 1 |
| c | d | b | b | d | 1 | 0 | 1 | 0 |
| d | c | c | c | c | 1 | 0 | 1 | 0 |

INPUT

STATE TABLES

PATENTED MAR 28 1972

3,652,840

STATE DIAGRAMS

15

| PREVIOUS STATE | NEXT STATE | | OUTPUT | |
|---|---|---|---|---|
| | 0 | 1 | 0 | 1 |
| a | b | b | 0 | 1 |
| b | a | c | 0 | 1 |
| c | d | b | 1 | 0 |
| d | c | c | 1 | 0 |

INPUT (b)

12

(a)

| PREVIOUS STATE | NEXT STATE | | OUTPUT | |
|---|---|---|---|---|
| | 0 | 1 | 0 | 1 |
| a | b | b | 0 | 1 |
| b | a | c | 0 | 1 |
| c | b | d | 1 | 0 |
| d | c | c | 1 | 0 |

INPUT

13

17

(c)

| PREVIOUS STATE | NEXT STATE | | | | OUTPUT | | | |
|---|---|---|---|---|---|---|---|---|
| | $\overline{C0}$ | $\overline{C1}$ | C0 | C1 | $\overline{C0}$ | $\overline{C1}$ | C0 | C1 |
| a | b | b | b | b | 0 | 1 | 0 | 1 |
| b | a | c | a | c | 0 | 1 | 0 | 1 |
| c | d | b | b | d | 1 | 0 | 1 | 0 |
| d | c | c | c | c | 1 | 0 | 1 | 0 |

INPUT

STATE TABLES

INVENTOR.
WALTER C. LANNING
BY
HP Terry
ATTORNEY

INVENTOR
WALTER C. LANNING
BY
HP Terry
ATTORNEY

APPARATUS FOR CONVERTING NUMBERS BETWEEN POSITIVE AND NEGATIVE RADICES

BACKGROUND OF THE INVENTION

1. Field of the Invention

The invention pertains to radix converters and more particularly to apparatus for converting numbers between positive and negative radices.

2. Description of the Prior Art

It is well known in accordance with the discipline of number theory that a number can be expressed by the juxtaposition of the coefficients of the orders of the implied radix. The coefficients are ordinarily arranged in order of descending significance. For example, the digits of an interger N may be expressed as:

$$N = a_{N-1}a_{N-2} \ldots a_1a_0$$

where the $a_i$'s represent the aforesaid coefficients. *It is understood that this number representation is significant only when a radix is assigned to the number system. Hence, the above number representation is actually an abbreviated expression for the general numerical form:*

$$N = a_{N-1}r^{N-1} + a_{N-2}r^{N-2} + \ldots + a_1r^1 + a_0r^0$$

where $r$ represents the radix of the number system utilized.

As is well understood the decimal number system, commonly utilized in the commercial and scientific disciplines, employs a radix of +10. It is furthermore appreciated that the binary number system utilized in the current digital technology has a radix of +2.Furthermore, a diversity of number systems are known for a variety of purposes that utilize a wide range of radices. These radices are usually positive.

Systems of numbers have recently been developed utilizing negative radices which systems provide unique advantages with respect to systems having positive radices. Negative radix number systems are described in detail in a series of articles entitled "Negative Radix Arithmetic" by M. P. de Regt appearing in the May through Dec., 1967, and Jan., 1968, issues of the periodical, *Computer Design*. The advantages of apparatus based on negative radix number systems are fully discussed in said articles and will not be repeated here for brevity. In particular, digital computation systems based on a number system having a negative binary radix (−2) are discussed. Computers instrumented in accordance with such systems offer significant advantages with respect to the more usual computers that utilize number systems having a positive binary radix (+2).

It may be appreciated that presently available digital computers as well as peripheral input and output equipment largely utilize the positive binary number system. In order that this existing equipment be compatible with computers based on negative binary number systems, converters for transforming numbers between positive and negative radices are required. For example, in order to utilize existing peripheral input equipment, such as card and tape readers, converters for transforming numbers from positive radices to negative radices may be required to provide input data to computers utilizing the negative binary number system. As a further example, in order to utilize existing peripheral output equipment such as printers and card punches, converters are required to transform the negative radix numbers provided by the computer into the positive radix format that may be utilized by the output devices.

It may also be appreciated that the input and output data are usually available in bit serial fashion in the order of digits increasing bit significant where the digits representative of the signs of the numbers become available subsequent to the occurrence of the most significant digit of the number.

Algorithms are known for transforming positive and negative numbers, respectively, expressed in a positive radix to the equivalent numbers expressed in a negative radix. Conversely, algorithms are known for transforming numbers expressed in a negative radix to the equivalent positive ad negative numbers, respectively, expressed in a positive radix. The algorithms with respect to positive and negative numbers are different from one another in accordance with the sign of the number to be converted. For example, the conversion algorithm of a positive number in a positive radix to the equivalent number in a negative radix differs from the conversion algorithm of a negative number in a positive radix to the equivalent number in a negative radix.

A converter for transforming binary numbers from a positive radix to a negative radix instrumented in accordance with the corresponding algorithms is known in the art that operates on the number to be converted in bit serial fashion in the order of increasing bit significance. Since the transformation for a positive number in the positive binary radix differs from the transformation of a negative number in the positive binary radix, this prior art converter must be preset preceding the converter must be preset preceding the conversion operation in accordance with the polarity of the number to be converted. Since the sign digit is normally nöt available until subsequent to the occurrence of the most significant digit of the number, additional equipment may be required to store the serially occurring bits of the input number as well as the sign digit before the conversion can commence. The sign digit storage device can then be utilized to preset the converter in accordance with the polarity of the number to be converted. As well as utilizing additional equipment hence increasing costs, this procedure may require excessive time with respect to the high speed computation systems in which it may be utilized.

Alternatively, the converter may utilize an auxiliary connection to the sign position of a register internal to the computer. This approach may be undesirable with respect to design techniques utilized in the current digital computer technology.

SUMMARY OF THE INVENTION

The primary object of the invention is to provide radix converters that operate on the input numbers in conventional bit serial fashion in the order of increasing bit significance where the conversions are performed independently of the signs of the numbers to be transformed.

It is another object of the invention to provide converters that transform numbers in a positive radix to equivalent numbers in a negative radix and, conversely, to provide converters that transform numbers in a negative radix to the equivalent numbers in a positive radix. Converters that perform both conversions in accordance with a control signal are also provided.

It is recognized, in accordance with the present invention, that when negative numbers in a positive radix system are expressed in radix complement form, an algorithm may be developed for converting both positive and negative numbers in a positive radix system to the equivalent numbers in a negative radix system in identically the same manner. For example, negative binary numbers which may be expressed in conventional 2's complement form may be converted to equivalent binary numbers in a −2 radix representation. Converters instrumented in accordance with this algorithm and hence in accordance with the present invention therefore perform radix transformations of positive and negative numbers in bit serial fashion in the order of increasing bit significance without requiring prior knowledge of the signs of the numbers.

The algorithm may also be utilized in deriving converters in accordance with the present invention for transforming negative radix numbers to equivalent positive radix numbers where the numbers having negative signs are provided in radix complement form. For example, in the preferred binary converters of the present invention, the positive radix binary output numbers are 2' provided in the 2's complement form.

The algorithm is instrumented to provide preferred embodiments of converters in accordance with the present invention comprising a first bistable element for providing signals representative of the odd and even orders of the number to be converted. Gating means responsive to the signals from the first bistable element and the digits of the number to be converted provides signals to the inputs of a second bistable element. An EXCLUSIVE OR logic circuit coupled to the output of the second bistable element and responsive to the digits of the number to be converted provides the converted digits of the number. Means are included to preset the first and second bistable means to predetermined states, respectively, independently of the signs of the numbers to be converted.

DESCRIPTION OF THE PREFERRED EMBODIMENTS

Figure 1:
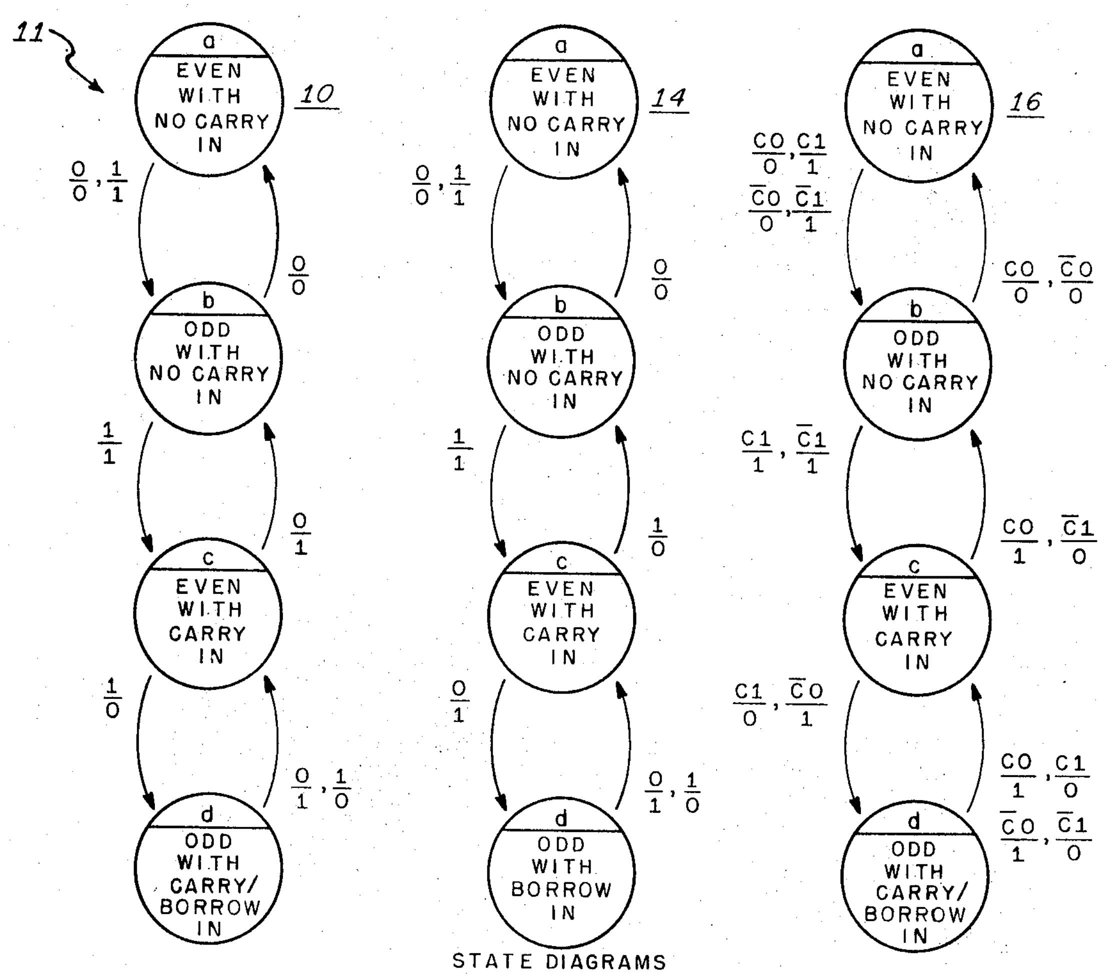
FIG. 1 illustrates three state diagrams with corresponding state tables useful in the development of the circuits of the preferred embodiments of the invention.

In order to facilitate an understanding of the structure and operation of the preferred converter embodiments of the invention, the algorithm used in the development of the circuits will first be explained. In the algorithm, with regard to conversion from positive to negative radices, the coefficients of the even orders of tee number to be converted transform without modification to the corresponding coefficients of the equivalent number in the negative radix since $$a_{2i}(+r)^{2i}=a_{2i}(-r)^{2i} \quad i=0, 1, 2 \ldots$$

where the $a_{2i}$ represent the even coefficients of the number in the positive radix.

The coefficients of the odd orders of the positive radix number to be converted must be modified since $$a_{2i+1}(+r)^{2i+1} \neq a_{2i}{}^{+}{}_{1}(-r)^{2i+1} \quad i=0, 1, 2, \ldots$$

where the $a_{2i+1}$ are the coefficients of the odd orders of the positive radix number. In accordance with the algorithm of the present invention, the coefficients of the odd orders of the positive radix number to be converted may be replaced by equivalent coefficients in accordance with the following identities:

$$a_{2i-1}(+r)^{2i+1}=(+r)^{2i+2}-(+r)^{2i+2}+a_{2i}+(+r)^{2i+1}$$
$$=(+r)^{2i+2\ 2i}{}_{+}-[(+r)-a_{2+}l]\,(+r)^{2i+1}$$
$$=(+r)^{2i+2}-{}^{*}{}_{2i+1}(+r)^{2i+1}$$
$$=(+r)^{2i+2}+a^{*}{}_{2i+1}(-r)\ 2i-1$$

Where $a^{*}{}_{2i+1}$ = radix complement of digit $a_{2i+1}$.

Thus, it may be appreciated that an odd coefficient of the positive radix number to be converted may be replaced by the radix complement of the coefficient with a carry of one being propagated to and combined with the coefficient of the next higher order.

In accordance with the algorithm both odd and even coefficients having the value zero transform unmodified to the value zero since $$0(+r)^{i}=0\,(-r)^{i} \quad i=0, 1, 2 \ldots.$$

Further in accordance with the algorithm both positive and negative numbers may be transformed from positive to negative radices when the negative quantities are expressed in their radix complement form. For example, negative numbers in a +10 radix may be transformed by the algorithm to their −10 radix equivalents when these negative quantities are expressed in 10's complement form.

The algorithm may also be utilized to transform numbers in a negative radix to the equivalent numbers in a positive radix. As described above, with respect to the converse conversion, the even coefficients transform unmodified since $$b_{2i}(-r)^{2i}=b_{2i}(+r^{2i} \quad i=0, 1, 2, \ldots.$$

where the $b_{2i}$ represents the coefficients of the even orders of the negative radix number to be converted.

In a similar manner to that described above with respect to the converse transformation, the coefficients of the odd orders of the negative radix number to be converted may be replaced by equivalent coefficients in accordance with the following identities: $b_{2i+1}(-r)^{2i+1}=(-r)^{2i+2}-(-r)2i^{+}2+b_{2i+1}(-r)^{2i+1}$ $$=(-r)^{2i+2}-[(-r)-b_{2i+1}](-r)^{2i+1}$$
$$=(-r)^{2i+2}-b^{*}{}_{2i+1}\,(-r)^{2i+1}$$
$$=(-r)^{2i+2}+b^{*}{}_{2i+1}(+)^{2i+1}.$$

Where $b^{*}{}_{2i+1}$ = radix complement of digit $b_{2i+1}$ and where the $b_{2i+1}$ are the coefficients of the odd orders of the negative radix number to be converted.

It may thus be appreciated that an odd coefficient of the negative radix number to be converted may be replaced by the radix complement of the coefficient with a carry of one being propagated to and combined with the coefficient of the next higher order of the number. It is to be understood that since, in negative radix numbers, alternate orders have alternate signs, a carry into an order is effected as a subtraction and a borrow from an order is effected as an addition.

It may be appreciated that coefficients of odd and even orders having the value zero may be transformed unaltered for the reason discussed above with respect to the converse transformation.

It may be further appreciated that the negative radix numbers, which may be transformed by the algorithm, are independent of sign in accordance with the said de Regt articles. If when the negative radix quantity has a positive value associated therewith, an equivalent positive radix number results in conventional sign plus magnitude format. If the negative radix number to be converted has a negative value associated therewith, an equivalent positive radix number results in radix complement form. For example, transforming negative binary numbers expressed in negative radix format results in the equivalent 2's complement binary number in positive radix form.

It may be appreciated from the foregoing descriptions of the algorithms for the transformation from positive to negative radices and the converse transformation that the conversion algorithms for transforming in both directions, respectively, are in fact the same algorithm. The primary difference between the two conversions is the manner in which the carries are combined with the higher orders.

It should be appreciated that numbers expressed in negative radix form may require more digit positions than the corresponding numbers in positive radix form. At most, two additional digit positions may be required. These digit positions may conveniently be appended to the higher orders of the positive radix number to be converted which digits conventionally convey the sign information.

The utilization of the foregoing algorithm will be illustrated with respect to the following examples. The number +421 in the +10 radix format may be converted to the −10 radix form in accordance with the algorithm. The number to be converted may be expressed as 00421 for the reasons discussed above where the zero's may be considered representative of the positive polarity of the quantity. The coefficient of the least significant order has a value of 1 and since this is an even order, the coefficient is transformed unmodified. The coefficient of the next following odd order has a value of 2 and therefore transforms into its 10's complement 8, with a carry being propagated into the next higher order. The coefficient of the next higher even order has a value of 4 which, combined with the previous carry, becomes 5. Since the order is even, the coefficient of 5 is transmitted unmodified. Since the coefficient of the next two higher orders have values of zero, these coefficients are transmitted unmodified. It may thus be appreciated that +421 in the +10 radix has been transformed into 581 in the −10 radix, the equivalence of the two numbers being readily verified in accordance with the teachings of the said de Regt articles.

As a further example, −421 in the +10 radix may be converted to the −10 radix by utilizing the algorithm described above. The number is first transformed into its equivalent 10's complement notation which may be expressed as 99579. The two most significant 9's are representative of the negative sign of the quantity. Applying the algorithm in identically the same manner as in the preceding example, the five digits of the +10 radix number transform to 01639 in the −10 radix notation. It may readily be verified in a manner similar to that described with respect to the preceding example that 1639 in the −10 radix is equivalent to −421 in the +10 radix.

As a further example, it may be observed that the number 581 in the −10 radix resulting from the previously exemplified transformation may be reconverted to +421 in the +10 radix by utilizing the algorithm as described above. The coefficient of the least significant order of the number to be converted has a value of 1. Since the order is even, the coefficient transforms unmodified. The coefficient of the next higher odd order as a value of 8 which, in accordance with the algorithm transforms to its 10's complement 2 and a carry is propagated to the next higher order. The coefficient of the next higher order, which is an even order, has a value of 5. In accordance with the algorithm, the carry diminishes the value of the coefficient to 4; and since the order is even, the coefficient of 4 is transmitted unmodified. The transformed number +421 is thus provided as required.

As described above, the number −421 in the +10 radix was transformed to 1639 in the −10 radix. It may be appreciated that by utilizing the algorithm, 1639 in the −10 radix may be reconverted to −421 in the +10 radix. Since 01639 in the negative radix is a negative quantity, the application of the algorithm in the manner described with respect to the previously given example provides the 10's complement of −421 which may be expressed as 99579, where the two left most nines are representative of the negative sign of the number.

It may be appreciated from the foregoing explanations and examples that only four conditions may exist with respect to the orders of numbers to be converted. An order may be odd with no previous carry or the order may be odd with a previous carry. The order may be even with no previous carry or the order may be even with a previous carry. It is understood that the value of the carry for all magnitude radices is unity. These conditions may be expressed in terms of the state diagrams illustrated in FIG. 1 in accordance with the discipline of Sequential Logic Theory as taught in the textbook "Finite State Models for Logical Machines" by F. C. Hennie, published by John Wiley & Sons, Inc. in 1968. It may be appreciated that although the four stated conditions are independent of the magnitude of the radix utilized, the state diagrams illustrated in FIG. 1 were derived for the binary radices for reasons of practicality and that state diagrams for higher magnitude radices may be derived by those skilled in the art in accordance with the teachings of the present invention.

Referring now to FIG. 1*a*, the state diagram and the associated state table corresponding to transformations of numbers from the +2 radix to the −2 radix are illustrated. It may be appreciated that the bits of the number to be converted appear in bit serial fashion in the order of increasing bit significance. The state diagram 10, illustrated in FIG. 1*a*, represents the four possible states *a*, *light b*, *c* and *d*, of a sequential machine that may implement the four conditions described above in accordance with the algorithm of the present invention. For example, state a represents the state of the converter for processing an even order coefficient where no previous carry has been generated for combining therewith. The indicia associated with the state transfer arrows are representative of the values of the input coefficients over the values of the output coefficients as the converter processes the orders of the numbers to be converted. For example, regarding the indicia 11 when the converter is processing an even order digit with no previous carry (state *a*) and the value of the input coefficient is ZERO, the value of the converted output conjunctive coefficient will be ZERO and the machine will transfer to state b. If the value of the input coefficient is ONE, the value of the output coefficient will be ONE and the machine will also transfer to state *b*. Since state *b* corresponds to the odd order conversion with no previous carry, the operations performed during state a will not generate carrys. As a further example, when the converter is in state *b* and the value of the input digit is ONE, the value of the output digit will be ONE and the converter will transfer to state *c*. If, however, the value of the input digit is ZERO, the value of the output digit will be ZERO and the machine will transfer back to state *a*.

In a similar manner, the converter transfers to states *c* and *d* in response to the values of the input digits generating the output digits indicated by the indicia associated with the state transfer arrows. It may be appreciated that as the input number is applied, in bit serial fashion, to a four-state machine implemented in accordance with the state diagram 10, the converter will transfer between the states *a*, *b*, *c* and *d*, providing the digit of the converted output number in bit serial fashion.

The operations of a four-state converter in accordance with the present invention, as represented by the state diagram 10, are formally given in state table 12. As an example, line 13 of the state table 12 represents the condition where an input of ZERO causes the converter to transfer from a previous state *a* to a next state *b*, generating an output digit of ZERO. When the input digit is ONE, the converter transfers from the previous state a to the next state *b*, providing the output digit of ONE.

Referring now to FIG. 1*b*, a state diagram 14 and a corresponding state table 15 for a sequential machine for converting binary numbers from the −2 radix to the +2 radix are illustrated. The representations of the state diagrams 14 and the state table 15 are similar to those described with respect to FIG. 1*a* and are well understood in accordance with the discipline of sequential logic theory discussed in said Hennie textbook and will not be repeated here for brevity.

Referring now to FIG. 1*c*, a state diagram 16 and a corresponding state table 17 are illustrated for a converter for transforming binary numbers between the positive and negative radices in accordance with the state of a control signal C. When the control signal C is binary ONE, a +2 to −2 radix conversion occurs and when the control signal C is binary ZERO a −2 to +2 radix conversion is effected. It may be appreciated that the state diagram 16 is a combination of the state diagrams 10 and 14.

While the state diagrams and state tables of FIG. 1 have been illustrated in terms of binary numbers, it may be appreciated that similar four-state diagrams and corresponding tables may be derived for radices other than 2. These diagrams may then include additional input/output indicia associated with the transfer arrows to accommodate the higher magnitude radices. It is therefore understood that for radix conversions of numbers where the digits appear in serial fashion, four-state sequential machines are required.

The state tables 12, 15 and 17, may be utilized in accordance with the aforesaid sequential logic theory to derive apparatus for performing the conversions. The formal procedures utilized to develop the circuits are well understood by those skilled in the art, are explained in the said F.C. Hennie textbook and will not be described here for brevity.

Figure 3:
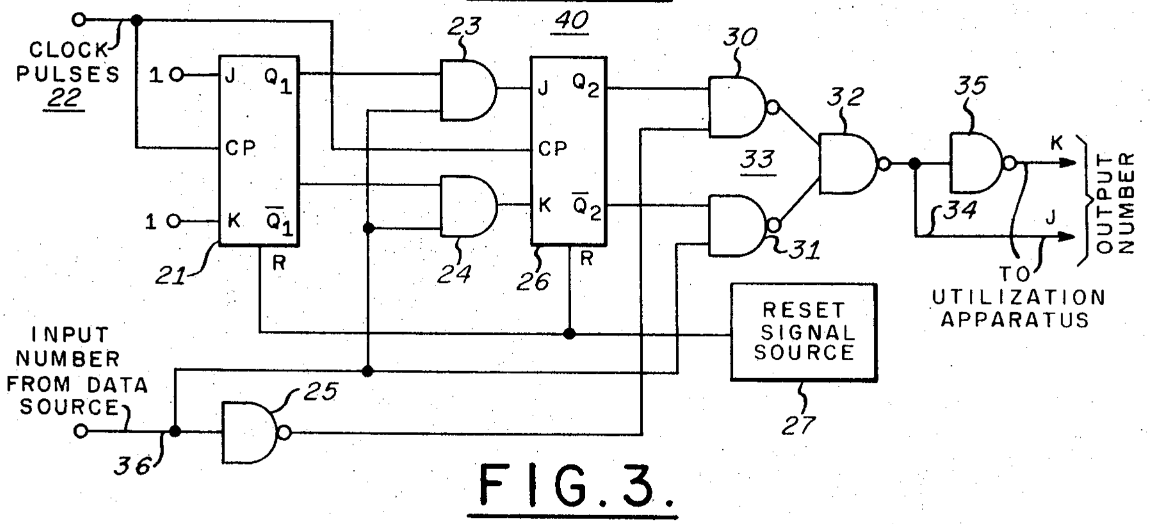
FIG. 3 is a schematic logic diagram of a converter for transforming binary numbers from a −2 radix to a +2 radix in accordance with a preferred embodiment of the invention.
Figure 4:
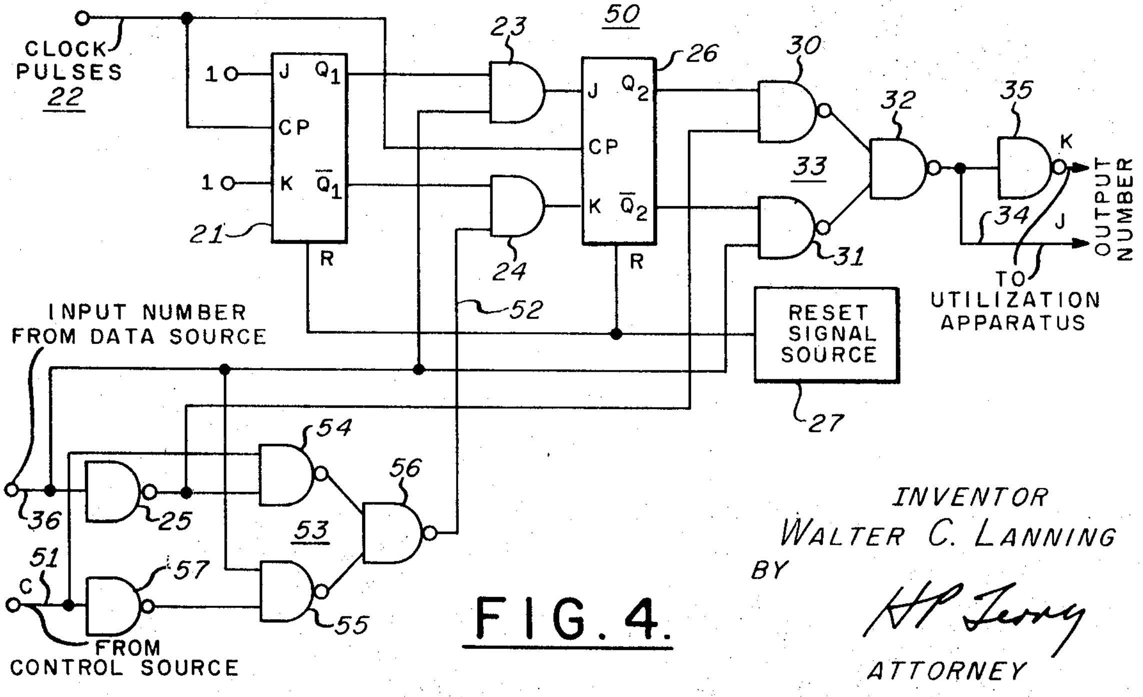
FIG. 4 is a schematic logic diagram of a converter for transforming binary numbers between +2 and −2 radices selectively with regard to a control signal in accordance with a preferred embodiment of the invention.

It is understood that the formal procedures of sequential logic theory applied to the state tables 12, 15 and 17 may yield a diversity of converters within the scope of the present invention. The optimum converter designs derived from the state tables 12, 15 and 17 are illustrated in FIGS. 2, 3 and 4, respectively.

Figure 2:
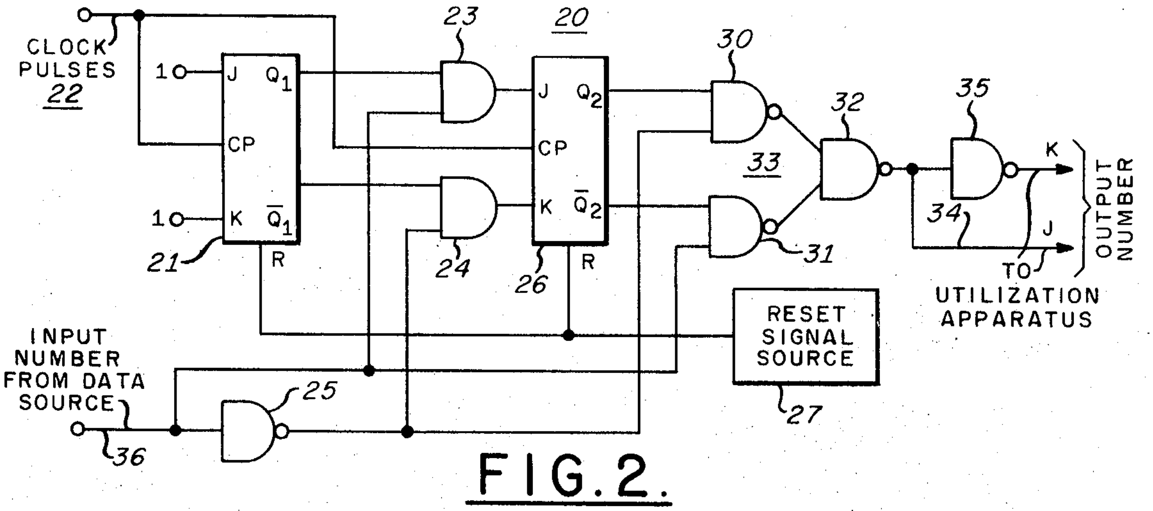
FIG. 2 is a schematic log diagram of a converter for transforming binary numbers from a +2 radix to a −2 radix in accordance with a preferred embodiment of the invention.

Referring now to FIG. 2, a preferred converter 20 in accordance with the present invention, for transforming binary numbers from the +2 radix to the −2 radix is illustrated. The converter 20 includes a J–K flip-flop 21. The J and K inputs to the flip-flop 21 have a binary ONE voltage applied thereto. Clock pulses are applied to the clock input of the flip-flop 21 from a line 22. With these connections it is understood that the flip-flop 21 will toggle in response to the incoming clock pulses.

The bistable outputs $Q_1$ and $\overline{Q}_1$, from the flip-flop 21 are applied respectively as inputs to AND gates 23 and 24. The serially occurring bits of the number to be converted are also applied as an input to the AND gate 23 and the inverse bits are applied as an input to the AND gate 24 via an inverter 25. As previously explained, the bits of the input number are applied in the order of increasing bit significance. It may be appreciated that since the clock pulses may be arranged to occur synchronously with respect to the input bits, the output signals $Q_1$ and $\overline{Q}_1$ of the toggling flip-flop 21 define the alternate odd and even orders of the input number to be converted.

The outputs of the AND gates 23 and 24 are applied respectively to the J and K inputs of a J–K flip-flop 26. The clock pulses applied from line 22 to the clock input to the flip-flop 26 steer the logical states provided by the AND gates 23 and 24 into the flip-flop 26 in a manner well known in the art. It may be appreciated that the flip-flop 26 is utilized to store the previous carrys generated during a conversion operation and are provided at the $Q_2$ and $\overline{Q}_2$ outputs thereof. A reset signal source 27 is utilized to preset the flip-flops 21 and 26 to their respective zero states prior to a conversion operation, for reasons to be explained.

It may be appreciated that the two bistable flip-flops 21 and 26 define a four-state device as required in practicing the present invention.

Although the AND gates 23 and 24 and the flip-flop 26 are illustrated as individual components, it is understood by those skilled in the art that flip-flops functionally equivalent thereto, with conjunctively combined inputs, are readily procurable from manufacturers of digital electronic equipment. These flip-flops are compatible with the NAND logic circuits illustrated in FIG. 2.

The $Q_2$ and $\overline{Q}_2$ outputs of the flip-flop 26 are applied respectively as inputs to NAND gates 30 and 31. The bits of the input number are also applied as an input to the NAND gate 31 and the inverted bits from the inverter 25 are applied as an input to the NAND gate 30. The respective outputs of the NAND gates 30 and 31 are applied as inputs to a NAND gate 32. It may be appreciated that the NAND gates 30, 31 and 32 form an EXCLUSIVE OR logic circuit 33 for providing the EXCLUSIVE OR combination of the output of the flip-flop 26 and the number to be converted.

The output of the circuit 33 appearing on a line 34 provides the bits of the converted output number. The output of an inverter 35 in combination with the output on the line 34 provide signals appropriate for application to a J–N utilization device.

While the preferred embodiment of the converter illustrated in FIG. 2 has been described in terms of J–K flip-flops, it will be understood by those skilled in the art that bistable memory elements such as delay lines, R–S flip-flops, T flip-flops and the like may be resorted to without departing from the spirit and scope of the invention.

Particularly with respect to the J–K flip-flops 21 and 26, the flip-flops may be chosen to be of a type that responds to the states of its J and K inputs at the occurrence of the trailing edges of the clock pulses applied to the clock input thereof.

The operation of the +2 radix to −2 radix converter 20 illustrated in FIG. 2 will be described with respect to the following example where the number +1011 in the +2 radix is transformed to an equivalent number in the −2 radix. It is understood that the number +1011 represents the quantity plus 11. Two additional zero's may be appended to the higher order digits for the reasons previously explained by conventional means not shown. The number to be converted may thus be expressed as 001011 where the two left most digits are representative of the positive sign of the number.

The converter 20 is conditioned for operation by presetting the flip-flops 21 and 26 to their respective ZERO states by means of the reset signal source 27. The ZERO state of the flip-flop 21 is representative of an even order of the number to be converted and the ZERO state of the flip-flop 26 is representative of no previous carry. The number to be transformed is applied to input terminal 36 of the converter 20 in bit serial fashion in the order of increasing bit significance.

The least significant digit, having a value of ONE, is thus applied to the input terminal 36. Since the order is even and there is no previous carry, the digit should be transmitted unmodified and no carry should be generated for propagation to the next order. Thus with the NAND gate 31 enabled by the $\overline{Q}_2$ output of the flip-flop 26, the binary ONE input digit on the terminal 36 is transmitted therethrough and hence to the output lead 34 via the NAND gate 32. Since the digit experiences two conversions in being transmitted through the NAND gates 31 and 32, a binary ONE output digit appears on the lead 34 as required.

Since the AND gate 23 is disabled by the flip-flop 21 and the AND gate 24 is disabled by the input digit via the inverter 25, the flip-flop 26 remains in the zero state in response to the trailing edge of the clock pulse associated with the input digit. Thus the flip-flop 26 stores the condition of no carry to the next higher order as required. The trailing edge of the clock pulse associated with the input digit also toggles the flip-flop 21 to the ONE state which is representative of the next occurring odd order of the input number to be converted.

The next occurring input digit of ONE is of odd order and, therefore, should be transformed to its 2's complement with a carry propagated to the next higher order. It may be appreciated that in the binary number system the 2's complement of the digit ONE is ONE. Thus with the flip-flop 26 in the ZERO state, the input digit is transmitted through the NAND gates 31 and 32 to the output lead 34. Since the gates 31 and 32 twice invert the input digit of ONE, a binary ONE appears on the output lead 34 as required.

Since the AND gate 23 is now enabled by the $Q_1$ output of the flip-flop 21 and the binary ONE state of the input digit at the terminal 36, a binary ONE is applied to the J input of the flip-flop 26. Since the AND gate 24 is disabled by the $\overline{Q}_1$ output of the flip-flop 21, a binary ZERO is applied to the K input of the flip-flop 26. The trailing edge of the clock pulse thus steers the flip-flop 26 to the ONE state which is representative of the carry to be propagated to the next higher order. The trailing edge of the clock pulse also toggles the flip-flop 21 to the ZERO state which is representative of the even order next to occur.

Since the next occurring even order digit has a value of ZERO, the previous carry should add unity to it thereby providing a value of ONE. Because the order of the digit is even the value of ONE should be transmitted unmodified.

Thus with the carry storage flip-flop 26 now in the ONE state, the inverted input digit from the inverter 25 is transmitted through the NAND gates 30 and 32 to provide a binary ONE on the output lead 34 as required.

The operations performed on this digit should not propagate a carry to the next higher order. Since the AND gate 23 is disabled by the flip-flop 21 and the AND gate 24 is enabled thereby and by the binary ONE provided by the input digit through the inverter 25, the binary ZERO and binary ONE states will be applied to the J and K inputs of the flip-flop 26 respectively. Therefore the flip-flop 26 will be steered to the ZERO state by the trailing edge of the clock pulse, thus storing the required condition of no carry to the next order. The trailing edge of the clock pulse also toggles the flip-flop 21 to the ONE state which is representative of the odd order next to occur.

The next occurring digit of odd order, having a value of ONE, is transmitted through the NAND gates 31 and 32 to provide the required binary ONE digit on the output terminal 34 in the manner previously described with respect to the preceding digits. Since a carry is to be propagated to the next higher order, the AND gates 23 and 24 provide the appropriate logical signals to the flip-flop 26 to steer it to the ONE state thereby storing the carry in the manner previously described with respect to the preceding orders.

The two next occurring digits, which are the sign digits of the number to be converted, have the respective values of ZERO and are transformed, by the converter 20, into the digits ONE and ZERO respectively in the manner previously described with respect to the preceding orders.

Thus the number 001011 in the +2 radix is transformed by the converter 20 of the present invention to 011111 in the −2 radix. Hence it may be appreciated that the converter 20 of FIG. 2 may transform positive numbers in the +2 radix to equivalent positive quantities in the −2 radix.

The foregoing example illustrated the radix transformation by the converter 20 of the quantity plus 11. As a further example, the transformation of the quantity minus eleven from the +2 radix to the −2 radix by means of the converter 20 may be effected.

In accordance with the previously described algorithm of the present invention, the number −001011, which is the binary representation of the quantity minus eleven, is first converted to its 2's complement form of 110101 by conventional means not shown. Prior to the radix transformation operation, the flip-flops 21 and 26 must be preset to their respective ZERO states by the reset signal source 27 as previously explained.

The digits of the input number to be converted, 110101, are applied in the order of increasing bit significance to the input terminal 36. The converter 20 provides the corresponding output digits 110101 on the output lead 34 in a manner similar to that explained with respect to the previously described example. Thus the output number 110101 is representative of the quantity minus eleven in the −2 radix form as required.

It may thus be appreciated that positive and negative binary numbers may be transformed from the +2 radix to the −2 radix by means of the converter 20 illustrated in FIG. 2.

Referring now to FIG. 3, where like reference numerals indicate like components with respect to FIG. 2, a converter 40 is illustrated for transforming positive and negative numbers from the −2 radix to the +2 radix. The structure of the converter 40 is similar to that of the converter 20 with the exception that the AND gate 24 is directly responsive to the input digits rather than to the inverses thereof.

The operation of the converter 40 is similar to that of the converter 20 and may conveniently be understood by a consideration of the converses of the examples previously given.

Consider the conversion to the +2 radix of the quantity plus eleven in the −2 radix, where 011111 is the binary representation thereof. Prior to the conversion operations, the flip-flops 21 and 26 are preset to their respective ZERO states by the reset signal source 27 for the reasons given with respect to FIG. 2. The least significant digit, which is of even order and having the value ONE, is transmitted via the terminal 36 through the NAND gates 31 and 32 to the output terminal 34 to become the least significant digit of the output number. The least significant output digit has a value of ONE with no carry to be propagated to the next order as required by the algorithm of the present invention. Thus with the AND gate 23 disabled by the flip-flop 21 and with the AND gate 24 enabled by the flip-flop 21 and the binary ONE state of the input digit, the logical conditions ZERO and ONE are applied respectively to the J and K inputs of the flip-flop 26. Hence upon the occurrence of the trailing edge of the clock pulse associated with the input digit being converted, the binary ZERO state is steered into the flip-flop 26 thus storing the required condition of no carry to the next order. It may be noted that the flip-flop 26 was already in the ZERO state prior to the application of the clock pulse. The trailing edge of the clock pulse also toggles the flip-flop 21 to the ONE state which is representative of the odd order next to occur.

Since the coefficient of the next occurring odd order has a value of ONE, the digit should transform to its 2's complement of ONE with a carry propagated to the next higher order, in accordance with the algorithm of the present invention. The input digit of ONE is transmitted through the NAND gates 31 and 32 to the output lead 34 providing the required output digit of ONE. Since the AND gate 23 is enabled by the flip-flop 21 and the binary ONE state of the input digit and the AND gate 24 is disabled by the flip-flop 21, the trailing edge of the associated clock pulse steers the binary ONE condition into the flip-flop 26. The binary ONE state of the flip-flop 26 is representative of a stored carry as required.

The next occurring even digit having a value of ONE is transmitted via the inverter 25 through the NAND gates inputs of the flip-flop providing a binary ZERO output digit on the lead 34 as required.

The AND gates 23 and 24 provide the binary ZERO and binary ONE logical conditions to the J and K INPUTS OF THE FLIP-flop 26 respectively. The trailing edge of the clock pulse hence steers the binary ZERO condition into the flip-flop 26 representative of no carry as required.

The next three occurring digits 011 of the number to be converted are transformed to the digits 001 which appear on the output lead 34 in a manner similar to that described with respect to the preceding digits. Thus it is appreciated that the number 011111 in the −2 radix is transformed to the number 001011 in the +2 radix by the converter 40 of FIG. 3 as required, the numbers being representative of the quantity plus eleven.

The converter 40 may also, for example, be utilized to perform the −2 radix to +2 radix conversion with respect to the quantity minus 11, the number 110101 representing the quantity minus eleven in the −2 radix. In a manner similar to that described with respect to the previous example, the converter 40 provides the number 110101 on the output lead 34, which number being the 2's complement representation in the +2 radix of the quantity minus 11.

Thus it may now be appreciated that the converter 40 illustrated in FIG. 3 transforms positive and negative −2 radix numbers into their equivalent +2 radix representations, where the negative quantities are provided in 2's complement form.

Referring now to FIG. 4, where like reference numerals indicate like components with respect to FIG. 3, a converter 50 is illustrated for performing transformations on binary numbers between +2 and −2 radices in accordance with a control signal C at an input terminal 51. When the signal C is in the binary ONE state a +2 to −2 radix conversion is effected. Conversely, when the signal C is in the ZERO state, a −2 to +2 radix conversion is performed.

The structure of the converter 50 is similar to that described with respect to FIGS. 2 and 3 with the exception of the input 52 to the AND gate 24. The input 52 to the AND gate 24 is provided by an EXCLUSIVE OR logic circuit 53 comprised of NAND gates 54, 55 and 56. The logic network 53 provides the EXCLUSIVE OR combination of the input number to be converted and the control signal C to the input 52 of the gate 24.

Thus it may be appreciated that when the signal C is in the binary ONE state the NAND gate 55 is disabled via an inverter 57 and the NAND gate 54 is enabled by the control signal. The digits of the input number are therefore applied to the AND gate 24 via the serially connected NAND gates 25, 54 and 56. It is thus understood that the inverses of the input digits are applied to the AND gate 24 in a manner equivalent to that described with respect to the converter 20 of FIG. 2. Hence, when the control signal C is in the binary ONE state, the converter 50 transforms numbers from the +2 radix to the −2 radix in manner similar to that described with respect to FIG. 2.

Conversely, when the control signal C is in the binary ZERO state, the NAND gate 55 is enabled via the inverter 57 and the NAND gate 54 is disabled by the binary ZERO state of the signal C. Thus the digits of the input number are applied to the AND gate 24 via the serially connected NAND gates 55 and 56. The double immersion provided thereby is equivalent to the direct connection of the input number to the AND gate 24 as depicted in FIG. 3. Hence when the control signal C is in the binary ZERO state, the converter 50 transforms numbers from the −2 radix to the +2 radix in the manner previously described with respect to FIG. 3.

It may now be appreciated that the present invention provides converters for transforming both positive and negative numbers between positive and negative radices without prior knowledge of the signs of the numbers to be converted.

It may further be appreciated that the digits of the input number to be converted may appear in conventional bit serial fashion in the order of increasing bit significance. Furthermore, when the negative radix number to be converted represents a positive quantity, the output number is conveniently provided in sign plus magnitude format. When the negative radix number to be converted is representative of a negative quantity, the output number is conveniently generated in the radix complement form.

It may further be appreciated that the converters of the present invention for transforming from the +2 radix to the −2 radix accept as inputs the conventional 2's complement form of number representation.

It may also be appreciated that a bidirectional radix converter is provided that conveniently provides radix transformations in accordance with the state of a control signal, which converter is readily adaptable to the Large Scale Integrated Circuit construction currently favored in the art.

While the invention has been described in its preferred embodiments, it is to be understood that the words which have been used are words of description rather than limitation and that changes may be made within the purview of the appended claims without departing from the true scope and spirit of the invention its broader aspects.

I claim:

1. Apparatus for converting number representations between positive and negative radices comprising first bistable means for providing bistable signals alternating in timed relation with the odd and even orders of the digits of said number representations in one of said radices, second bistable means, gating means coupled to receive said bistable signals and said digits for providing signals to said second bistable means, logic means coupled to said second bistable means and coupled to receive said digits for providing the digits of the converted number representations in the other of said radices, and means for presetting said first and second bistable means to predetermined states, respectively, independently of the signs of said number representations.

2. The apparatus of claim 1 for converting said number representations from a positive to a negative radix in which said first bistable means comprises toggleable flip-flop means having two outputs for providing signals respectively representative of the odd and even orders of said digits of said number representations in said positive radix, said second bistable means comprises steerable flip-flop means having two inputs, said gating means comprises first AND gate means responsive to said digits of said number representations in said positive radix and one of said outputs of said toggleable flip-flop means for providing the conjunctive combination thereof to one of said inputs of said steerable flip-flop means and second AND gate means responsive to the logical inverse of said digits of said number representations in said positive radix and the other of said outputs of said toggleable flip-flop means for providing the conjunctive combination thereof to the other of said inputs of said steerable flip-flop means, and said logic means comprises EXCLUSIVE OR logic means for providing said digits of said converted number representations in said negative radix, said presetting means being coupled to preset said first and second flip-flop means to the ZERO state.

3. The apparatus of claim 1 for converting said number representations from a negative to a positive radix in which said first bistable means comprises toggleable flip-flop means having two outputs for providing signals respectively representative of the odd and even orders of said digits of said number representations in said negative radix, said second bistable means comprises steerable flip-flop means having two inputs, said gating means comprises first AND gate means responsive to said digits of said number representation in said negative radix and one of said outputs of said toggleable flip-flop means for providing the conjunctive combination thereof to one of said inputs of said steerable flip-flop means and second AND gate means responsive to said digits of said number representations in said negative radix and the other of said outputs of said toggleable flip-flop means for providing the conjunctive combination thereof to the other of said inputs of said steerable flip-flop means, and said logic means comprises EXCLUSIVE OR logic means for providing said digits of said converted number representations in said positive radix, said presetting means being coupled to preset said first and second flip-flop means to the ZERO state.

4. Apparatus for converting number representations between positive and negative radices in accordance with a control signal comprising first bistable means for providing bistable signals alternating in timed relation with the odd and even orders of the digits of said number representations in one of said radices, second bistable means, gating means coupled to receive said bistable signals and said digits for providing signals to said second bistable means, first logic means coupled to receive said digits and said control signal for providing signals to said gating means, and second logic means coupled to said second bistable means and coupled to receive said digits for providing the digits of the converted number representations in the other of said radices.

5. The apparatus of claim 4 in which said first bistable means comprises toggleable flip-flop means having two outputs for providing signals respectively representative of the odd and even orders of said digits of said number representations in said one of said radices, said second bistable means comprises steerable flip-flop means having two inputs, said gating means comprises first AND gate means responsive to said digits of said number representations in said one of said radices and one of said outputs of said toggleable flip-flop means for providing the conjunctive combination thereof to one of said inputs of said steerable flip-flop means and second AND gate means responsive to said signal from said first logic means and the other of said outputs of said toggleable flip-flop means for providing the conjunctive combination thereof to the other of said inputs of said steerable flip-flop means, said first logic means comprises first EXCLUSIVE OR logic means for providing said signal to said second AND gate means, and said second logic means comprises second EXCLUSIVE OR logic means for providing said digits of said converted number representations in said other of said radices.

6. Apparatus for converting number representations between positive and negative radices comprising four state means responsive to the digits of said number representations in one of said radices for assuming four states designated *a*, *b*, *c*, and*d* respectively in response to said digits and providing the corresponding digits of the converted number representations in the other of said radices, said four state means being so constructed and arranged as to sequentially assume said states in response to said digits of said number representations in said one of said radices in accordance with a state table selected from the group consisting of:

| Previous state | Next state 0 | Next state 1 | Output 0 | Output 1 | ← Input |
|---|---|---|---|---|---|
| a | b | b | 0 | 1 | |
| b | a | c | 0 | 1 | |
| c | b | d | 1 | 0 | |
| d | c | c | 1 | 0 | |

and

| Previous state | Next state 0 | Next state 1 | Output 0 | Output 1 | ← Input |
|---|---|---|---|---|---|
| a | b | b | 0 | 1 | |
| b | a | c | 0 | 1 | |
| c | d | b | 1 | 0 | |
| d | c | c | 1 | 0 | |

and, means for presetting said four state means to a predetermined state independently of the signs of said number representations. and 7. The apparatus of claim 6 in which said four state means comprises first and second bistable means at least one thereof being responsive to said digits of said number representations in said one of said radices, and logic means responsive to at least one of said bistable means for providing said digits of said converted number representations, said presetting means including means for presetting said first and second bistable means to predetermined states, respectively, independently of the signs of said number representations.

8. Apparatus for converting number representations between positive and negative radices in accordance with a control signal C comprising four state means responsive to said control signal and to the digits of said number representations in one of said radices for assuming four states designated *a*, *b*, *c* and *d* respectively in response to said control signal and to said digits and providing the corresponding digits of the converted number representations in the other of said radices, said four state means being so constructed and arranged as to sequentially assume said states in response to said control signal and to said digits of said number representations in said one of said radices in accordance with the state table:

| Previous state | Next state C0 | Next state C1 | Next state C0 | Next state C1 | Output C0 | Output C1 | Output C0 | Output C1 | ← Input |
|---|---|---|---|---|---|---|---|---|---|
| a | b | b | b | b | 0 | 1 | 0 | 1 | |
| b | a | c | a | c | 0 | 1 | 0 | 1 | |
| c | d | b | b | d | 1 | 0 | 1 | 0 | |
| d | c | c | c | c | 1 | 0 | 1 | 0 | |

and, means for presetting said four state means to a predetermined state independently of the signs of said number representations.

* * * * *